(12) United States Patent
Glasgow et al.

(10) Patent No.: US 9,928,722 B2
(45) Date of Patent: Mar. 27, 2018

(54) GARMENT TAGS FOR INTELLIGENT LAUNDERING ALERTS

(71) Applicant: eBay Inc., San Jose, CA (US)

(72) Inventors: Dane Glasgow, Los Altos, CA (US); David Ramadge, San Jose, CA (US); Bria Selhorst, Albany, CA (US); Corinne Elizabeth Sherman, San Jose, CA (US); Matthew Bret MacLaurin, Santa Cruz, CA (US); Timothy Carlson, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/442,436

(22) Filed: Feb. 24, 2017

(65) Prior Publication Data
US 2017/0162027 A1    Jun. 8, 2017

Related U.S. Application Data

(63) Continuation of application No. 14/578,365, filed on Dec. 20, 2014, now Pat. No. 9,594,996.

(51) Int. Cl.
| | |
|---|---|
| *G08B 21/18* | (2006.01) |
| *G06K 7/10* | (2006.01) |
| *D06F 93/00* | (2006.01) |

(52) U.S. Cl.
CPC ............ *G08B 21/18* (2013.01); *D06F 93/00* (2013.01); *G06K 7/10366* (2013.01)

(58) Field of Classification Search
CPC ................................ G08B 21/18; D06F 93/00
USPC ............. 340/539.1, 572.1, 572.4, 572.8, 5.1; 237/375
See application file for complete search history.

(56) References Cited

U.S. PATENT DOCUMENTS

| | | |
|---|---|---|
| 5,508,684 A | 4/1996 | Becker |
| 6,154,138 A | 11/2000 | Nilsson |
| 7,460,015 B2 | 12/2008 | Forster |
| (Continued) | | |

FOREIGN PATENT DOCUMENTS

| | | |
|---|---|---|
| CN | 102509130 A | 6/2012 |
| DE | 102009023228 A1 | 12/2010 |
| (Continued) | | |

OTHER PUBLICATIONS

"U.S. Appl. No. 14/578,365, Non Final Office Action dated Jun. 16, 2016", 7 pgs.

(Continued)

*Primary Examiner* — Toan N Pham
(74) *Attorney, Agent, or Firm* — Schwegman Lundberg & Woessner, P.A.

(57) ABSTRACT

Aspects of the present disclosure involve an apparatus, systems, and methods for providing intelligent laundering alerts. Example embodiments involve an intelligent garment tag that may be affixed to garments, and may store and provide information about the garment to which it is affixed. The information stored thereon describes various aspects of the garment including color, fabric, and laundering information. The intelligent garment tags further include an alert component for providing laundering alerts (e.g., a flashing or colored light, a warning noise, or a vibration) based on, for example, laundering device (e.g., washing machine or clothes dryer) compatibility.

20 Claims, 10 Drawing Sheets

(56) References Cited

U.S. PATENT DOCUMENTS

| | | | |
|---|---|---|---|
| 8,099,258 | B2 | 1/2012 | Alten et al. |
| 9,280,148 | B1 * | 3/2016 | Colett .............. G06K 19/06037 |
| 9,594,996 | B2 | 3/2017 | Glasgow et al. |
| 2001/0049846 | A1 | 12/2001 | Guzzi et al. |
| 2006/0180647 | A1 | 8/2006 | Hansen |
| 2007/0056081 | A1 | 3/2007 | Asprau |
| 2008/0116274 | A1 | 5/2008 | Aldridge |
| 2009/0278707 | A1 | 11/2009 | Biggins et al. |
| 2011/0080286 | A1 | 4/2011 | Schuster |
| 2012/0293326 | A1 | 11/2012 | Case, Jr. |
| 2013/0021152 | A1 | 1/2013 | Vock et al. |
| 2014/0103631 | A1 | 4/2014 | Chan et al. |
| 2014/0115748 | A1 | 5/2014 | Berns et al. |
| 2016/0180685 | A1 | 6/2016 | Glasgow et al. |

FOREIGN PATENT DOCUMENTS

| | | |
|---|---|---|
| WO | WO-2006137028 A1 | 12/2006 |
| WO | WO-2012048237 A2 | 4/2012 |

OTHER PUBLICATIONS

"U.S. Appl. No. 14/578,365, Notice of Allowance dated Nov. 3, 2016", 7 pgs.

"U.S. Appl. No. 14/578,365, Response filed Sep. 7, 2016 to Non Final Office Action dated Jun. 16, 2016", 8 pgs.

"Crash helmet with a useful smell", Science Daily. Source: Fraunhofer-Gesellschaft, i[Online]. Retrieved from the Internet: <URL: http://www.sciencedaily.com/releases/2010/06/100607112046.htm>, (Oct. 21, 2010), 3 pgs.

Campbell, Mikey, "Apple's "smart shoes" notify users when they need replacing", appleinsider, [Online]. Retrieved from the Internet: <URL: http://appleinsider.com/articles/13/01/24/apple-exploring-sensor-system-that-tells-users-when-their-shoes-wear-out>, (Jan. 24, 2013), 14 pgs.

Etherington, Darrell, "Apple Patents Smart Shoes That Feature Embedded Sensors, and Alarms for When You Need New Ones", [Online]. Retrieved from the Internet: <URL: http://techcrunch.com/2013/01/24/apple-patents-smart-shoes-that-feature-embedded-sensors-and-alarms-for-when-you-need-new-ones/>, (Jan. 24, 2013), 9 pgs.

* cited by examiner

GARMENT TAGS FOR INTELLIGENT LAUNDERING ALERTS

PRIORITY CLAIM

This application is a continuation of and claims the benefit of priority to U.S. application Ser. No. 14/578,365, filed on Dec. 20, 2014, entitled "GARMENT TAGS FOR INTELLIGENT LAUNDERING ALERTS," which is hereby incorporated by reference.

TECHNICAL FIELD

The present application relates to data processing. In particular, example embodiments relate to garment tags for providing intelligent laundering alerts.

BACKGROUND

Most clothing and other frequently laundered articles include labels with printed information describing a manner in which the article should be laundered. These laundering instructions are typically based on a type or color of the fabric. As an example, clothing labels include information such as "wash with like colors," "do not iron," or "dry-clean only." Failure to follow the provided laundering instructions may result in the item being damaged or destroyed. This type of laundry warning is often conspicuously located on labels that are now relatively ubiquitous, yet despite the potential unwanted effects of noncompliance, because of the laborious effort involved in checking each label in a load of laundry, these warnings regularly go unheeded. Further, the printed information on the labels often fades over time making compliance with laundering instructions even more difficult.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
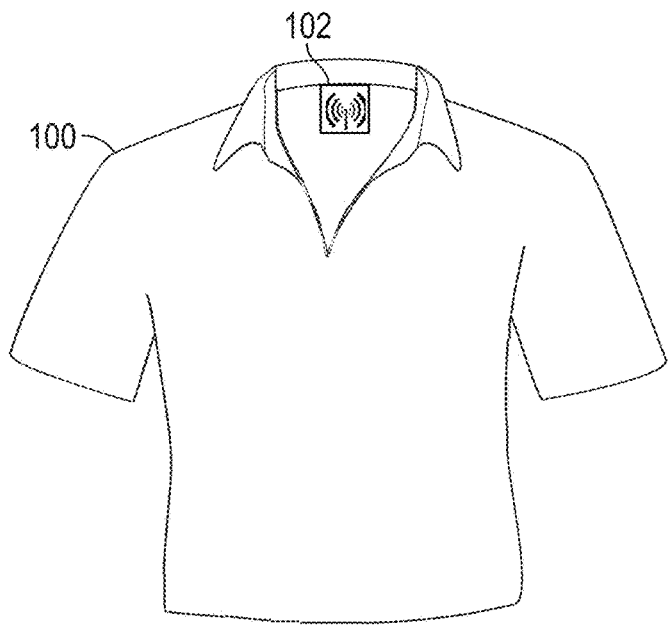
FIG. 1 is a context diagram illustrating a garment having an intelligent garment tag, according to an example embodiment.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve an apparatus, systems, and methods for providing intelligent laundering alerts. For the purpose of the present disclosure, the term "launder" is used in various tenses to refer to a process of making garments (e.g., clothes) or household linens (e.g., sheets and towels) ready for use including the steps of sorting, washing, drying, folding, hanging, ironing and steaming. Further, as used herein, the term "launderer" refers to a person performing or engaged in the process of laundering whether through utilization of one or more laundering devices or by hand. The term "laundering device" refers to any device or piece of equipment used in the process of laundering. Laundering devices may, for example, include washing machines (also referred to as a "laundry machine," a "clothes washer," or simply a "washer"), clothes dryers (also referred to as a "tumble dryer," a "drying machine" or simply a "dryer"), clothes iron (also referred to as a "flatiron" or simply an "iron"), a steamer, or a dry cleaning machine.

Example embodiments involve an intelligent garment tag that may be affixed to garments, and may store and provide information about a garment to which it is affixed. The information stored thereon describes various aspects of the garment including color, fabric, and laundering information. The intelligent garment tags further include an alert component for providing laundering alerts (e.g., a flashing or colored light, a warning noise, or a vibration) to assist launderers in the laundering process. The laundering alerts may, for example, assist launderers in sorting garments by color by either providing an alert that signals that garments of a similar color have been or should be grouped together, or by providing an alert that signals that a certain garment should not be included in a particular group of garments because it is not of the same or similar color. In another example, the laundering alerts may help to prevent launderers from using a laundering device that may damage or destroy clothing by providing an alert when the garment is placed near the laundering device. Consistent with some embodiments, the type of alert provided by the intelligent garment tags may be dependent upon a type of alert condition triggering the alert. For example, the intelligent garment tag may vibrate if items are of incompatible color, but flash a colored light if the garment is incompatible with a laundering device.

FIG. 1 is a context diagram illustrating a garment 100 having an intelligent garment tag 102, according to an example embodiment. As shown, the intelligent garment tag 102 is affixed to the garment 100 inside the collar at a location traditionally occupied by a clothing label with printed information. Accordingly, the intelligent garment tag 102 may replace traditional clothing labels or may be combined or affixed to such clothing labels. However, it shall be appreciated that the positioning of the intelligent garment tag 102 as illustrated in FIG. 1 is merely exemplary and is not intended to limit the positioning of the intelligent garment tag 102 to such a location. For example, the intelligent garment tag 102 may be integrated into a button or other adornment of the garment 100. Further, although the garment 100 is illustrated in FIG. 1 to be a shirt, the intelligent garment tag 102 is not specifically limited in application to shirts, and may be utilized for any type of garments or even other laundry items such as bedding, tablecloths, and towels.

The intelligent garment tag 102 stores information about the garment 100 such as color, fabric, and laundering information. The intelligent garment tag 102 may share the information about the garment 100 with other instances of the intelligent garment tag 102 or with various other devices (e.g., a controller). Consistent with some embodiments, the intelligent garment tag 102 may be implemented using a radio frequency identification (RFID) device to exchange such information using radio-frequency (RF) signals.

The intelligent garment tag 102 is also configured to provide various laundering alerts that may assist individuals in laundering the garment 100. These laundering alerts may, for example, assist launderers with sorting clothes prior to washing. For example, the intelligent garment tag 102 may provide an alert to notify a launderer that the garment 100 has been sorted into a pile of clothes that are not color compatible (e.g., dark colored clothing that may bleed onto the garment 100, which in this scenario is light colored). The laundering alerts may further assist launderers in avoiding laundering practices that may harm, damage, or destroy garments. For example, assuming the garment 100 is made of wool, the intelligent garment tag 102 may provide an alert to notify the launderer that the garment 100 is not to be dried in a clothes dryer.

Figure 2:
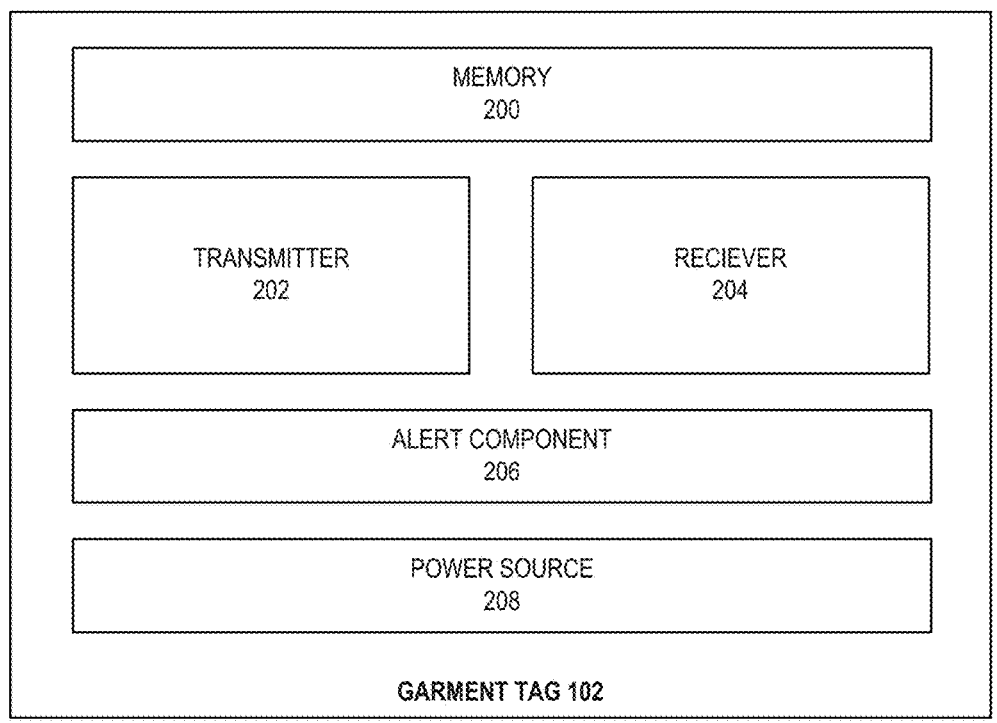
FIG. 2 is a block diagram illustrating various functional components of an intelligent garment tag, according to an example embodiment.

FIG. 2 is a block diagram illustrating various functional components of the intelligent garment tag 102, according an example embodiment. As is understood by skilled artisans in the relevant computer and Internet-related arts, each component (e.g., a module or engine) illustrated in FIG. 2 may represent a hardware component, a set of hardware components, or a set of logic (e.g., executable software instructions) and the corresponding hardware (e.g., memory and processor) for executing the set of logic. While the functional components of the intelligent garment tag 102 are depicted and discussed in the singular sense, it will be appreciated that in other embodiments multiple instances of any one of these components may be employed.

The intelligent garment tag 102 is illustrated in FIG. 2 as including a memory 200, a transmitter 202, a receiver 204, and an alert component 206, all configured to communicate with each other (e.g., via a bus, shared memory, a switch, or application programming interfaces (APIs)). It will be appreciated that one or more these various components of the intelligent garment tag 102 may be combined into a single component. As an example, the memory 200, transmitter 202, and receiver 204 may collectively form what skilled artisans would recognize as an RFID tag. As another example, the transmitter 202 and receiver 204 may be combined (e.g., to share common circuitry or a single housing) to form a transceiver.

Further, in some embodiments, one or more components may be omitted and additional components may also be included. For instance, in the example embodiment provided by FIG. 2, the intelligent garment tag 102 is also illustrated as including a power source 208 (e.g., a battery) capable of powering each of the various other functional components of the intelligent garment tag 102. However, in some other embodiments, the power source 208 may be omitted and the intelligent garment tag 102 may be powered by electromagnetic induction from magnetic fields produced by other devices in communication with the intelligent garment tag 102.

The memory 200 may be a non-volatile machine-readable memory unit (e.g., read-only memory or flash memory) on which is stored information about a garment (e.g., the garment 100 to which the intelligent garment tag 102 is affixed). In particular, the memory 200 stores one or more garment attributes that collectively comprise garment attribute data of the garment 100. The garment attributes describe aspects of the garment 100. The garment attributes may, for example, include a color attribute describing the color of the garment 100, a fabric attribute describing a fabric the garment 100 is made of (e.g., cotton, wool, or silk), and laundering-specific attributes related to a manner in which the garment 100 is to be laundered including the use of specific laundering devices. The color attribute may describe the color of the garment 100 as a specific color (e.g., red or white) or more generally as a shade of color (e.g., dark or light).

The laundering-specific attributes may include, but are not limited to, the following: a washing machine attribute describing the garment's (e.g., garment 100) compatibility with a washing machine; a bleaching attribute describing the garment's compatibility with bleach; a clothes dryer attribute describing the garment's compatibility with a clothes dryer; an ironing attribute describing the garment's compatibility with an iron; and a dry-cleaning attribute specifying whether the garment is to be dry-cleaned. Each of the laundering-specific attributes may specify whether the garment 100 is compatible with a particular laundering device, and under what settings the laundering device is to be used with the garment 100. As an example, a washing attribute may specify that the garment 100 may be washed in a washing machine at a temperature below a certain threshold. As another example, the dryer attribute may specify that the garment 100 is not to be dried in a clothes dryer or that the garment 100 may be dried, but only at a certain temperature.

The transmitter 202 is configured to transmit the garment attribute data stored in the memory 200 to another instance of the intelligent garment tag 102 or to another device capable of reading such information (e.g., an RFID reader). The transmitter 202 may transmit the garment attribute data to another intelligent garment tag 102 or another device upon receiving an interrogatory signal or request therefrom. The transmitter 202 may comprise an antenna capable of wirelessly transmitting the garment attribute data in one or many various frequencies and protocols. In some embodiments, the transmitter 202 comprises an antenna capable of transmitting a modulated radio-frequency (RF) signal. In other embodiments, the transmitter 202 comprises an antenna capable of transmitting the garment attribute data using a low energy data transmission protocol such as Bluetooth Low Energy (BLE).

The receiver 204 comprises an antenna configured to obtain data from other intelligent garment tags 102 and from other devices. As an example, the receiver 204 may work in conjunction with the transmitter 202 to transmit a request or interrogatory signal (e.g., an encoded radio signal) to a different instance of the intelligent garment tag 102, and in response, the receiver 204 is provided with garment attribute data of the garment to which the different instance of the intelligent garment tag 102 is affixed. As another example, the receiver 204 may receive control data from a controller that causes the intelligent garment tag 102 to provide an alert. Further details of such a controller are discussed below in reference to FIG. 3.

In some embodiments, the data received by the receiver 204 is provided as a modulated RF signals. In some embodiments, the data received by the receiver 204 is transmitted using a low energy data transmission protocol such as BLE.

The alert component 206 is configured to detect alert conditions and provide laundering alerts in response thereto. To this end, the alert component 206 may include a set of logic (e.g., a set of machine-readable instructions) for detecting an alert condition. An alert condition is a circumstance or set of circumstances giving rise to a laundering alert. Alert conditions may, for example, include garment color compatibility (e.g., the garment 100 is near other similarly colored garments), garment color incompatibility (e.g., the garment 100 is near dissimilarly colored garments), or laundering device incompatibility (e.g., the garment 100 is near or being used with a laundering device that may harm or damage the garment 100).

The laundering alerts provided by the alert component 206 in response to an alert condition may be one of several types of human-detectable sensory alerts including visual or luminescent alerts (e.g., flashing lights), an auditory alert (e.g., a beep or other sound), or a haptic alert (e.g., a vibration). Accordingly, the alert component 206 may comprise one or more of the following to provide human-detectable sensory alerts: a light emitting component (e.g., a light emitting diode (LED) or light bulb), an electroacoustic transducer (e.g., a speaker), or a haptic actuator.

Figure 3:
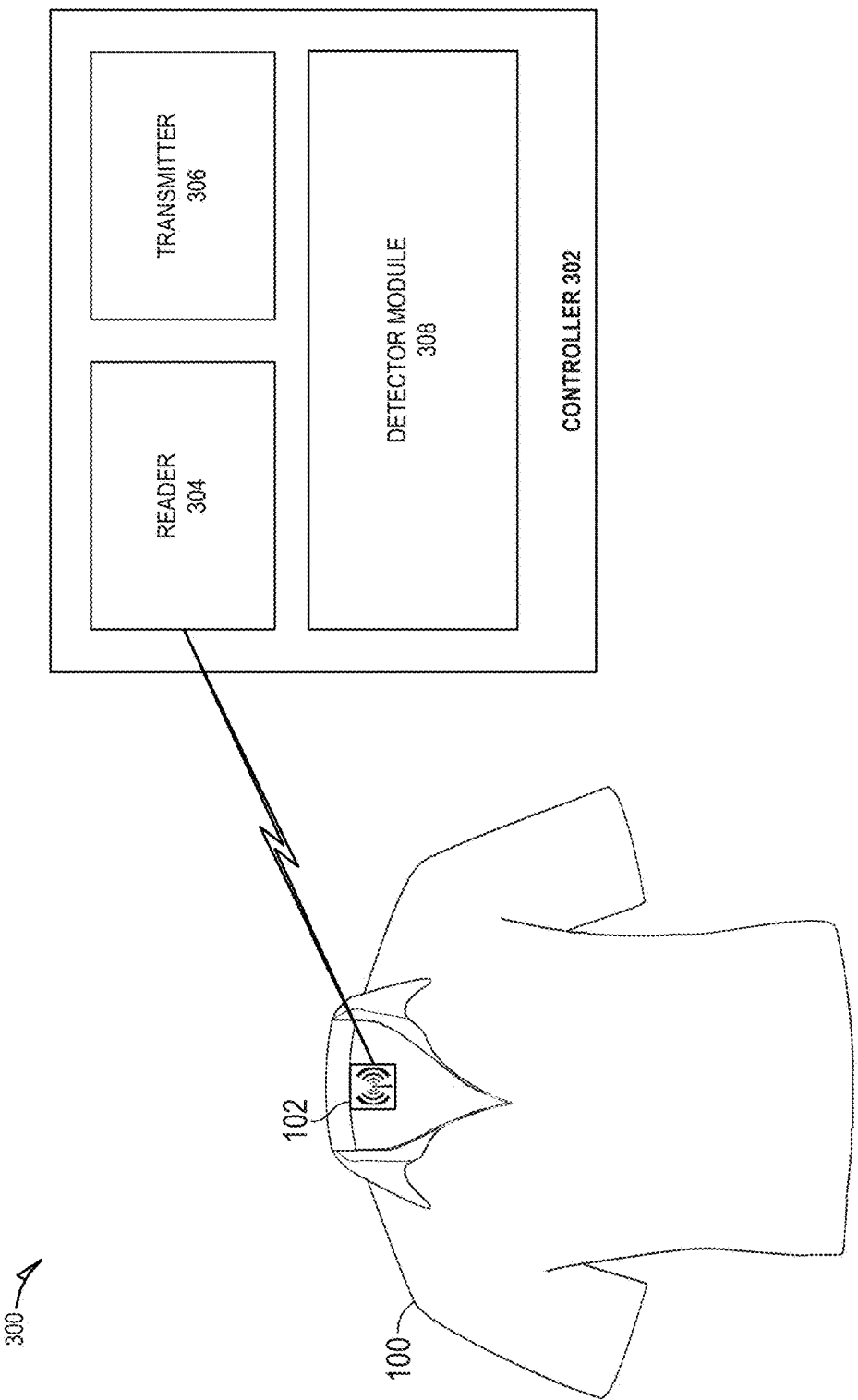
FIG. 3 is a system diagram illustrating an intelligent laundering environment, according to an example embodiment.

FIG. 3 is a system diagram illustrating an intelligent laundering environment 300, according to an example embodiment. To avoid obscuring the inventive subject matter with unnecessary detail, various functional components (e.g., modules and engines) that are not germane to conveying an understanding of the inventive subject matter have been omitted from FIG. 3. However, a skilled artisan will readily recognize that various additional functional components may be supported by the intelligent laundering environment 300 to facilitate additional functionality that is not specifically described herein.

As shown, the intelligent laundering environment 300 includes a controller 302 in communication with the intelligent garment tag 102 affixed to the garment 100. The controller 302 comprises a reader 304, a transmitter 306, and a detector module 308. The reader 304 is responsible for obtaining information (e.g., garment attribute data) from the intelligent garment tag 102. Accordingly, the reader 304 may comprise an antenna or integrated circuit capable of wirelessly retrieving information (e.g., garment attribute data) from the intelligent garment tag 102. In some embodiments, the intelligent garment tag 102 may be implemented as an RFID device or tag and accordingly, the reader 304 may be implemented as an RFID reader.

The transmitter 306 is responsible for providing control data to the intelligent garment tag 102. Accordingly, the transmitter 306 may comprise an antenna capable of wirelessly transmitting the control data to the intelligent garment tag 102. The control data, once received by the intelligent garment tag 102, causes the intelligent garment tag 102 to provide one or more laundering alerts.

The detector module 308 may be a hardware implemented module or a set of instructions stored on a computer-readable medium and the corresponding hardware (e.g., memory and processor) for executing the set of logic that is operable to detect an alert condition occurring within the intelligent laundering environment 300. Upon detecting the alert condition, the detector module 308 may work in conjunction with the transmitter 306 to provide control data to the intelligent garment tag 102 that causes the intelligent garment tag 102 to provide a laundering alert.

Although the controller 302 is illustrated to be in communication with a single instance of the intelligent garment tag 120, it shall be appreciated that the controller 302 may be in communication with multiple instances of the intelligent garment tag 102 that correspond to other garments. In this manner, the controller 302 may serve as a central hub for controlling and exchanging data with a plurality of intelligent garment tags 102. However, it shall be appreciated that in other embodiments, the controller 302 may be omitted, and multiple instances of the intelligent garment tag 102 may communicate and exchange data without the need for the controller 302. Further, while the controller 302 is illustrated in FIG. 3 to form a stand-alone component, it shall be appreciated that in other embodiments, the controller 302 may be implemented by a computer or be embedded in a laundering device (e.g., washing machine or clothes dryer) to provide additional functionality thereto. Moreover, in some embodiments, the controller 302 may be embedded in an instance of the intelligent garment tag 102.

Figure 4:
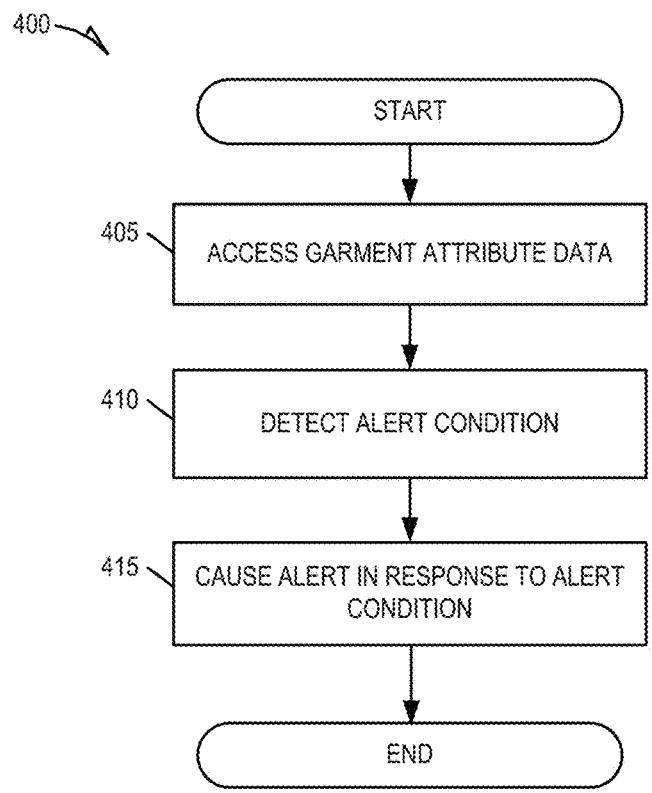
FIG. 4 is a flowchart illustrating a method for providing a laundering alert, according to an example embodiment.

FIG. 4 is a flowchart illustrating a method 400 for providing a laundering alert, according to an example embodiment. The method 400 may be embodied in computer-readable instructions for execution by a hardware component (e.g., a processor) such that the steps of the method 400 may be performed in part or in whole by the intelligent garment tag 102 or the controller 302, and accordingly, the method 400 is described below, by way of example with reference thereto. However, it shall be appreciated that the method 400 may be deployed on various other hardware configurations and is not intended to be limited to the intelligent garment tag 102 or the controller 302.

At operation 405, the receiver 204 or the reader 304 accesses garment attribute data of a garment (e.g., the garment 100) from a memory (e.g., memory 200) of an intelligent garment tag 102 corresponding to the garment. The garment attribute data describes various characteristics of the garment including, for example, a color, a fabric type, and laundering information (e.g., information describing various manners in which the garment should be laundered). Consistent with some embodiments, the operation 405 may be triggered by a determination that two or more garment tags are proximate (e.g., within a predefined distance of one another). Further, the receiver 204 or the reader 304 may obtain the garment attribute data by transmitting a request (or interrogatory signal) to the proximate garment tags, and receiving a data packet from the garment tags provided in response to the request, wherein the data packet comprises the garment attribute data.

At operation 410, the alert component 206 or the detector module 308 detects an alert condition based on the garment attribute data. The alert condition may, for example, be based on garment color compatibility or on laundering device compatibility. In some instances, the detecting of an alert condition may be based on a comparison of garment attribute data obtained from multiple garment tags. As an example, the alert component 206 of a first intelligent garment tag corresponding to a dark colored garment may detect that the garment has been placed in a sort pile or is otherwise proximate (e.g., within a predefined distance) to light colored clothing based on garment attribute information obtained from intelligent garment tags of the light colored clothing. In some instances, the alert component 206 or the detector module 308 may cause multiple garment tags to provide an identical alert (e.g., in situations in which a set of similarly colored garments are grouped together). Further examples of the operation 410 are discussed below in reference to FIGS. 5-9.

At operation 415, the alert component 206 or the controller 302 causes a human-detectable sensory alert to be provided by one or more intelligent garment tags 102 in response to detecting the alert condition. In instances in which the operation 415 is carried out by the intelligent garment tag 102, the alert component 206 may simply provide the human-detectable sensory alert via an embedded light emitting component (e.g., LED), electroacoustic transducer (e.g., a speaker), or haptic actuator. In instances in which the operation 415 is carried out by the controller 302, the controller 302 may transmit control data via the transmitter 306 to an intelligent garment tag 102 that causes the intelligent garment tag 102 to provide the human-detectable sensory alert upon receipt thereof.

Figure 5:
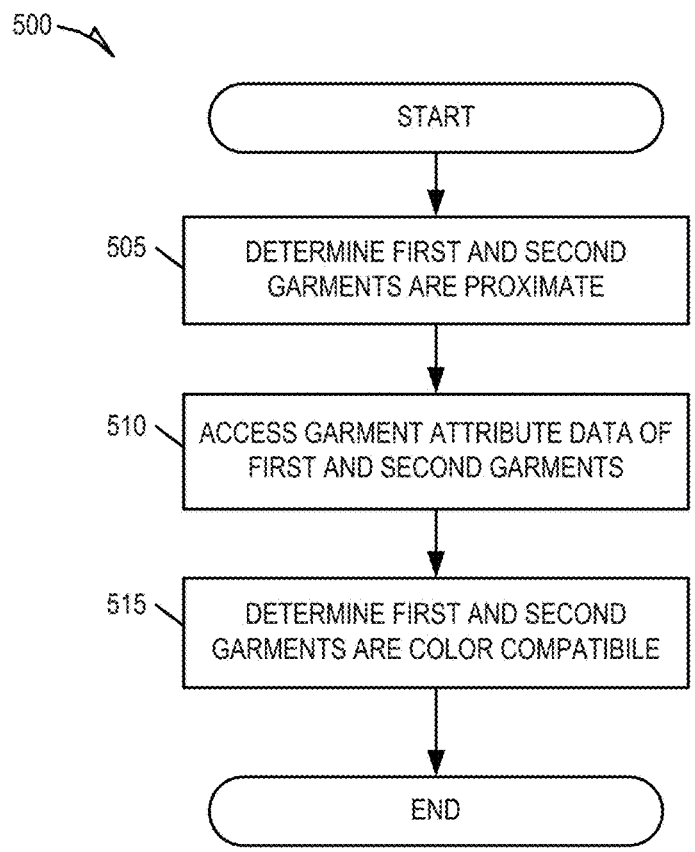
FIG. 5 is a flowchart illustrating a method for detecting a color compatibility of garments, according to an example embodiment.

FIG. 5 is a flowchart illustrating a method 500 for detecting a color compatibility of garments, according to an example embodiment. Consistent with some embodiments, the method 500 corresponds to the operation 410. The method 500 may be embodied in computer-readable instructions for execution by a hardware component (e.g., a processor) such that the steps of the method 500 may be performed in part or in whole by the intelligent garment tag 102 or the controller 302, and accordingly, the method 500 is described below, by way of example with reference thereto. However, it shall be appreciated that the method 500 may be deployed on various other hardware configurations and is not intended to be limited to the intelligent garment tag 102 or the controller 302.

At operation 505, the alert component 206 or detector module 308 determines that a first garment and a second garment are proximate (e.g., within a predefined distance of one another). The determination of the proximity of the garments may be based on the relative strength of the signal provided by respective transmitters 202 of intelligent garment tags affixed to each of the first and second garments.

At operation 510, the alert component 206 or the detector module 308 accesses garment attribute data for the first and second garments. At operation 515, the alert component 206 or the detector module 308 determines that the first and second garments are color compatible based on the garment attribute data of the first and second garments. In other words, the alert component 206 or the detector module 308 determines that the first and second garments are of like color. In this way, one or more of the intelligent garment tags 102 may be used to assist launderers in sorting laundry such that similar colors are grouped and washed together.

Figure 6:
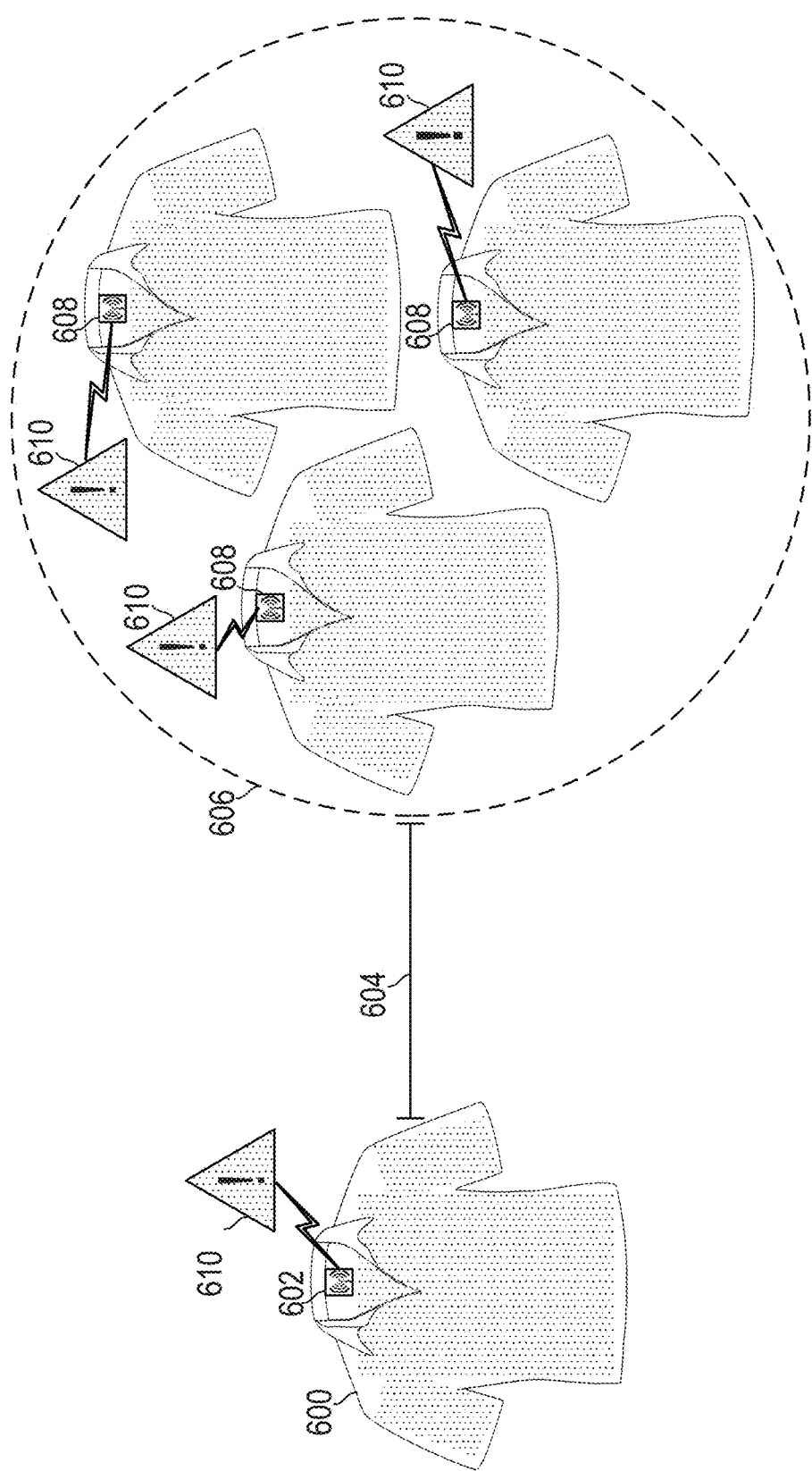
FIG. 6 is a context diagram illustrating an alert being provided by a plurality of intelligent garment tags based on color compatibility, according to an example embodiment.

FIG. 6 is a context diagram illustrating an alert being provided by a plurality of intelligent garment tags based on color compatibility, according to an example embodiment. As shown, a light colored garment 600 that includes a garment tag 602 is placed at a distance 604 from a plurality of additional light colored garments 606 each having a garment tag 608. As an example, the plurality of additional light colored garments 606 may represent a sort pile of clothes grouped together prior to being placed in a washing machine for cleaning. In this example embodiment, the garment tags 602 and 608 are instances of the intelligent garment tag 102.

The garment tag 602 determines that the garment 600 is proximate to the plurality of additional light colored garments 606 upon detecting the garment 600 being placed at the distance 604 from the plurality of additional light colored garments 606 (e.g., based on the strength of the signal provided by the garment tags 608). Upon determining that the garment 600 is proximate to plurality of additional light colored garments 606, the receiver 204 of the garment tag 602 obtains garment attribute data of each of the plurality of additional light colored garments 606 stored in a respective memory 200 of the garment tags 608. For example, the receiver 204 of the garment tag 602 may receive garment attribute data of each of the plurality of additional light colored garments 606 from a respective transmitter 202 of the garment tags 608 upon submitting a request therefor to the garment tags 608.

The garment tag 602 then compares the garment attribute data of the light colored garment 600 (e.g., stored in the memory 200 of the garment tag 602) with the garment attribute data of the plurality of additional light colored garments 606 to determine the color compatibility of the garments. Since the light colored garment 600 and the plurality of additional light colored garments 606 are all light colored, the garment tag 602 determines that the garments are color compatible. In response to this determination, the garment tag 602 provides an alert 610 and causes the garment tags 608 to provide an identical alert 610. Depending on the embodiment, the alert 610 may be an auditory, luminescent, or haptic alert. As an example, the alert 610 provided by the garment tags 602 and 608 may be a flashing light of the same color, pattern, or frequency. Because the garment tags 602 and 608 each provide the same alert 610 (e.g., a luminescent alert of a particular color), a launderer is notified that the garments are of similar color (e.g., light colored), and thusly should be sorted together for the purpose of laundering.

Figure 7:
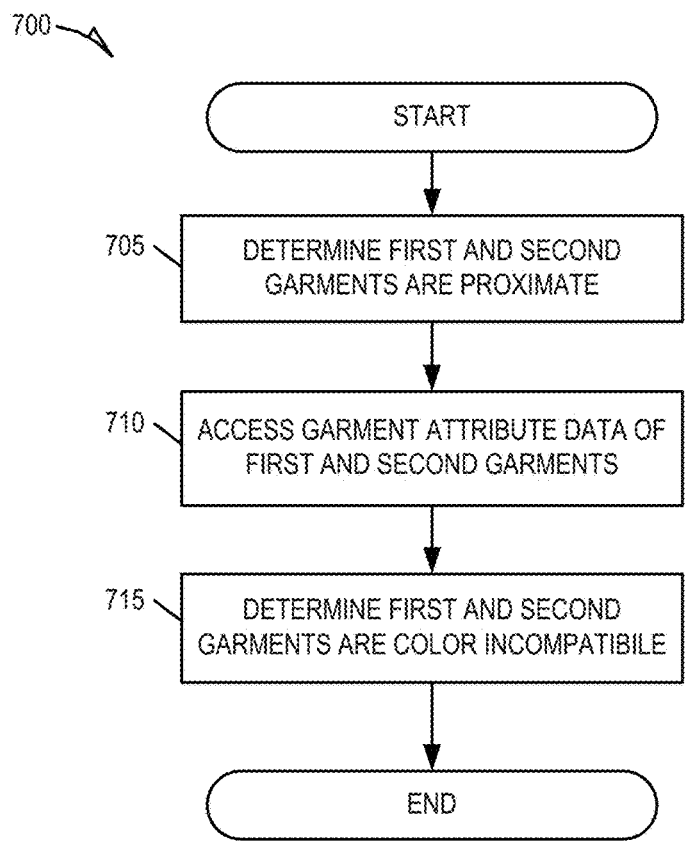
FIG. 7 is a flowchart illustrating a method for detecting color incompatibility of garments, according to an example embodiment.

FIG. 7 is a flowchart illustrating a method 700 for detecting a color incompatibility of garments, according to an example embodiment. Consistent with some embodiments, the method 700 corresponds to the operation 410 of method 400 (FIG. 4). The method 700 may be embodied in computer-readable instructions for execution by a hardware component (e.g., a processor) such that the steps of the method 700 may be performed in part or in whole by the intelligent garment tag 102 or the controller 302, and accordingly, the method 700 is described below, by way of example with reference thereto. However, it shall be appreciated that the method 700 may be deployed on various other hardware configurations and is not intended to be limited to the intelligent garment tag 102 or the controller 302.

At operation 705, the alert component 206 or detector module 308 determines that a first garment and a second garment are proximate (e.g., within a predefined distance of one another). The determination of the proximity of the garments may be based on the relative strength of the signal provided by respective transmitters 202 of intelligent garment tags affixed to each of the first and second garments.

At operation 710, the alert component 206 or the detector module 308 accesses garment attribute data for the first and second garments. At operation 715, the alert component 206 or the detector module 308 determines the first and second garments are color incompatible based on the garment attribute data of the first and second garments. In other words, the first and second garments are not of like color (or type of color) and may run the risk of bleeding colors onto each other. In this way, use of the intelligent garment tags 102 may help avoid situations in which the color of one garment discolors or tarnishes the color of another garment during laundering.

Figure 8:
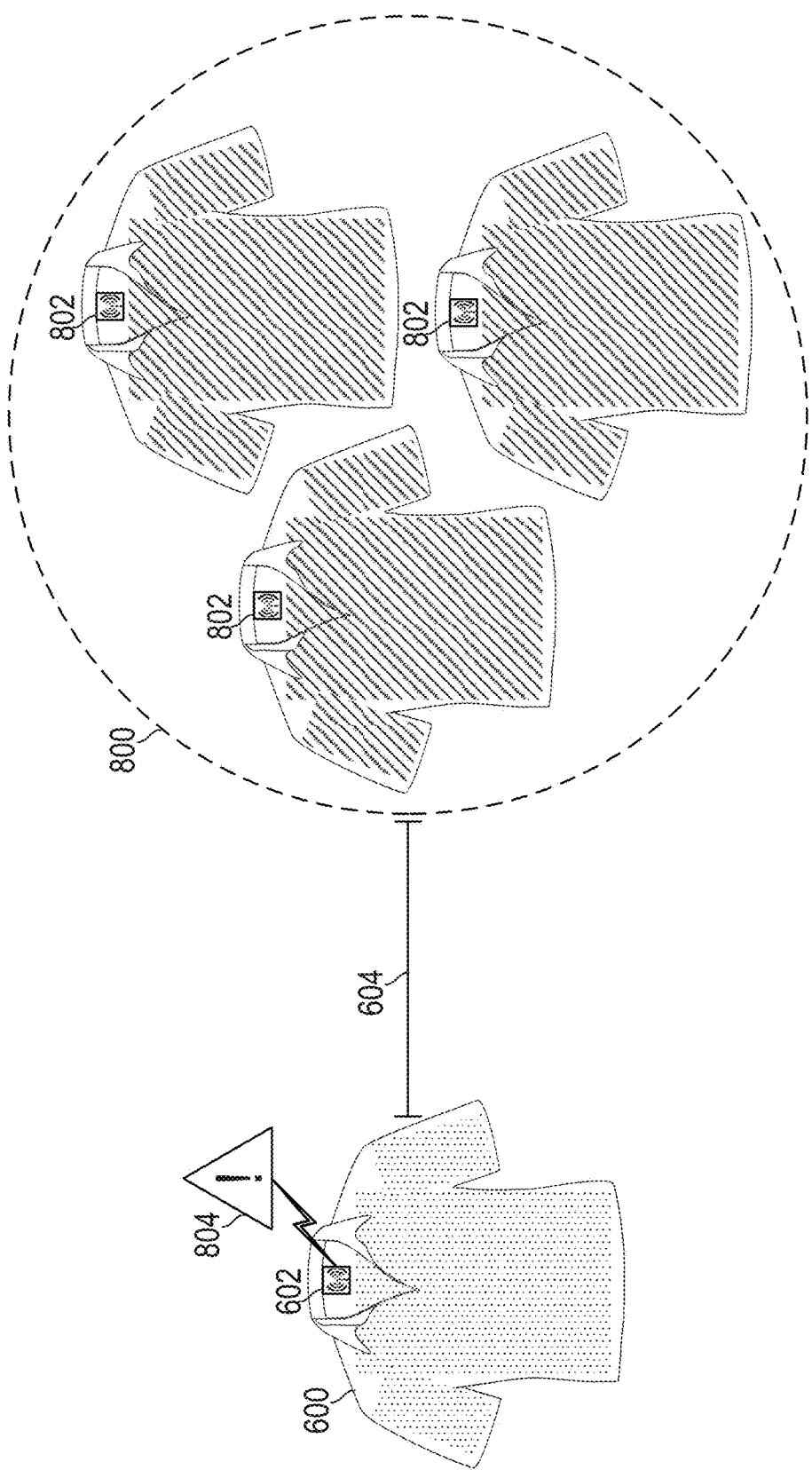
FIG. 8 is a context diagram illustrating an alert being provided by an intelligent garment tag based on laundering device incompatibility, according to an example embodiment.

FIG. 8 is a context diagram illustrating an alert being provided by an intelligent garment tag based on laundering device incompatibility, according to an example embodiment. As shown, the light colored garment 600 having the garment tag 602 is placed at the distance 604 from a plurality of dark colored garments 800 each having a garment tag 802. As an example, the plurality of dark colored garments 800 may represent a sort pile of clothes sorted prior to being placed in a washing machine for cleaning. In this example embodiment, the garment tags 602 and 802 are instances of the intelligent garment tag 102.

Upon determining that the light colored garment 600 is proximate to plurality of dark colored garments 800 (e.g., based on the light colored garment 600 being placed at the distance 604 from the plurality of dark colored garments 800), the receiver 204 of the garment tag 602 obtains garment attribute data of each of the plurality of dark colored garments 800 stored in a respective memory 200 of the garment tags 802. The garment tag 602 then compares the garment attribute data of the light colored garment 600 (e.g., stored in the memory 200 of the garment tag 602) with the garment attribute data of the plurality of dark colored garments 800 to determine the color compatibility of the garments. Since the light colored garment 600 and the plurality of dark colored garments 800 are not of the same color, the garment tag 602 determines that the garments are color incompatible. In response to this determination, the garment tag 602 provides an alert 804 (e.g., auditory, luminescent, or haptic alert). Because only the garment tag 602 of the light colored garment 600 provides the alert 804, a launderer is warned that the light colored garment 600 is not of similar color to the plurality of dark colored garments 800, and thusly should be separated from the plurality of dark colored garments 800 for the purpose of laundering so as to avoid having the plurality of dark colored garments 800 distort, tarnish, or otherwise discolor the light colored garment 600.

Figure 9:
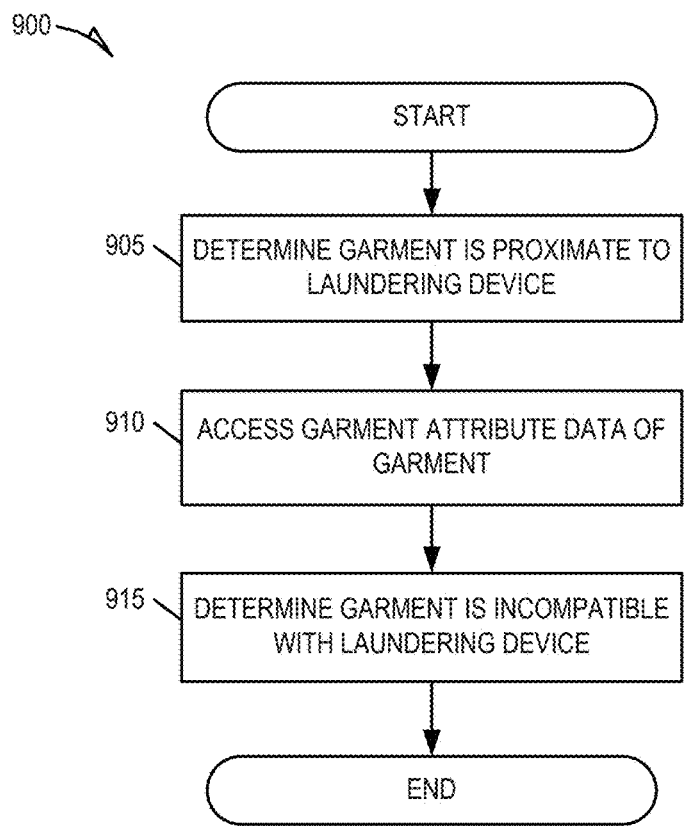
FIG. 9 is a flowchart illustrating a method for detecting laundering device incompatibility, according to an example embodiment.

FIG. 9 is a flowchart illustrating a method 900 for detecting laundering device incompatibility, according to an example embodiment. Consistent with some embodiments, the method 900 corresponds to the operation 410 of method 400. The method 900 may be embodied in computer-readable instructions for execution a hardware component (e.g., a processor) such that the steps of the method 900 may be performed in part or in whole by the intelligent garment tag 102 or the controller 302, and accordingly, the method 900 is described below, by way of example with reference thereto. However, it shall be appreciated that the method 900 may be deployed on various other hardware configurations and is not intended to be limited to the intelligent garment tag 102 or the controller 302.

Figure 10:
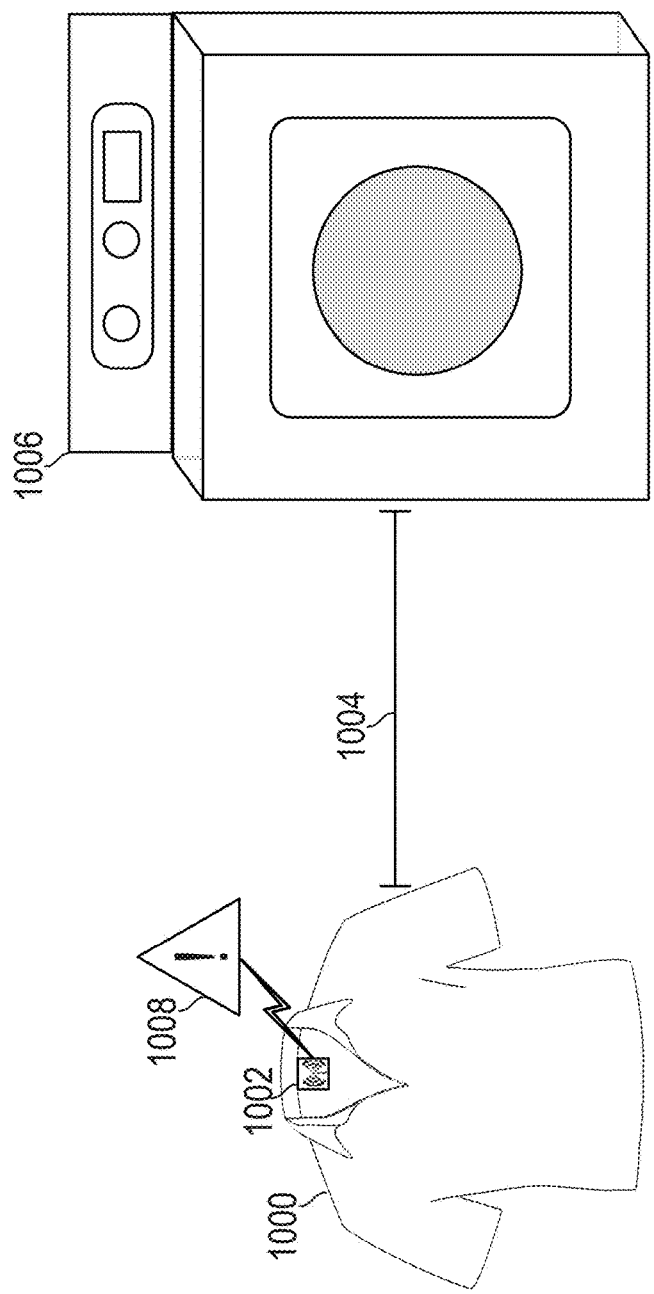
FIG. 10 is a context diagram illustrating an alert being provided by an intelligent garment tag based on color compatibility, according to an example embodiment.

At operation 905, the alert component 206 or detector module 308 determines that a garment is proximate to a laundering device. The determination of the proximity may, for example, be based on the relative strength of the signal provided by the transmitter 202 of an intelligent garment tag 102 affixed to the garments. As an illustrative example, FIG. 10 is a context diagram illustrating an alert being provided by a garment tag based on laundering device compatibility, according to an example embodiment. In particular, FIG. 10 illustrates a garment 1000 having a garment tag 1002, which is an instance of the intelligent garment tag 102, being placed at a distance 1004 from a laundering device 1006. Upon detecting the garment 1000 being placed at the distance 1004, the alert component 206 of the garment tag 1002 determines that the garment 1000 is proximate to the laundering device 1006.

Returning to FIG. 9, at operation 910, the alert component 206 or detector module 308 accesses the garment attribute data of the garment 1000 from the memory 200 of the garment tag 1002. At operation 915, the alert component 206 or the detector module 308 determines the garment 1000 is incompatible with the laundering device 1006. As an example, the garment attribute data of the garment 1000 may indicate that the garment 1000 cannot be dried in a clothes dryer, and in instances in which the laundering device 1006 corresponds to a clothes dryer, the alert component 206 or the detector module 308 determines the garment 1000 is incompatible with the laundering device 1006. As another example, the garment attribute data of the garment 1000 may indicate that the garment 1000 cannot be ironed, and in instances in which the laundering device 1006 corresponds to an iron, the alert component 206 or the detector module 308 determines the garment 1000 is incompatible with the laundering device 1006.

As illustrated in FIG. 10, in response to the determination that the garment 1000 is not compatible with the laundering device 1006, the garment tag 1002 provides an alert 1008 (e.g., auditory, luminescent, or haptic alert). In this way, use of the intelligent garment tags 102 may help launderers avoid using laundering devices with certain garments that may cause damage thereto.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network 1402.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 11:
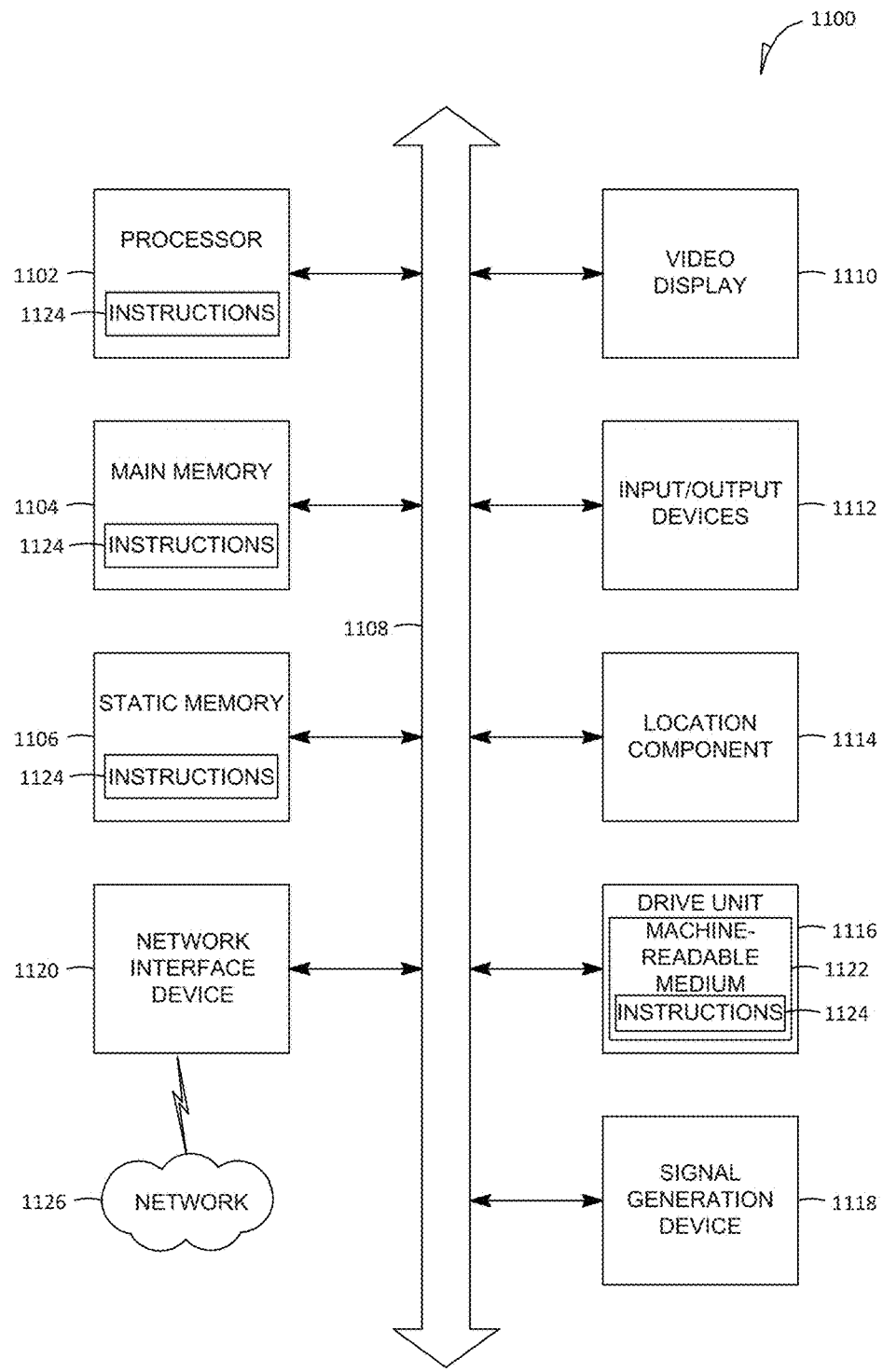
FIG. 11 is a diagrammatic representation of a machine in the example form of a computer system within which a set of instructions for causing the machine to perform any one or more of the methodologies discussed herein may be executed.

FIG. 11 is a diagrammatic representation of a machine in the example form of a computer system 1100 within which a set of instructions for causing the machine to perform any one or more of the methodologies discussed herein may be executed. The computer system 1100 may correspond to the controller 302, consistent with some embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a personal digital assistant (PDA), a cellular telephone, a smart phone (e.g., iPhone®), a tablet computer, a web appliance, a handheld computer, a desktop computer, a laptop or netbook, a set-top box (STB) such as those provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display 1110 (e.g., a liquid crystal display (LCD) or a cathode ray tube (CRT)). The computer system 1100 also includes one or more input/output (I/O) devices 1112, a location component 1114, a drive unit 1116, a signal generation device 1118 (e.g., a speaker), and a network interface device 1120. The I/O devices 1112 may, for example, include a keyboard, a mouse, a keypad, a multi-touch surface (e.g., a touchscreen or track pad), a microphone, a camera, and the like.

The location component 1114 may be used for determining a location of the computer system 1100. In some embodiments, the location component 1114 may correspond to a GPS transceiver that may make use of the network interface device 1120 to communicate GPS signals with a GPS satellite. The location component 1114 may also be configured to determine a location of the computer system 1100 by using an Internet Protocol (IP) address lookup or by triangulating a position based on nearby mobile communications towers. The location component 1114 may be further configured to store a user-defined location in the main memory 1104 or the static memory 1106. In some embodiments, a mobile location enabled application may work in conjunction with the location component 1114 and the network interface device 1120 to transmit the location of the computer system 1100 to an application server or third party server for the purpose of identifying the location of a user operating the computer system 1100.

In some embodiments, the network interface device 1120 may correspond to a transceiver and antenna. The transceiver may be configured to both transmit and receive cellular network signals, wireless data signals, or other types of signals via the antenna, depending on the nature of the computer system 1100.

Machine-Readable Medium

The drive unit 1116 includes a machine-readable medium 1122 on which is stored one or more sets of data structures and instructions 1124 (e.g., software) embodying or used by any one or more of the methodologies or functions described herein. The instructions 1124 may also reside, completely or at least partially, within the main memory 1104, the static memory 1106, and/or the processor 1102 during execution thereof by the computer system 1100, with the main memory 1104, the static memory 1106, and the processor 1102 also constituting machine-readable media 1122.

Consistent with some embodiments, the instructions 1124 may relate to the operations of an operating system (OS). Depending on the particular type of the computer system 1100, the OS may, for example, be the iOS® operating system, the Android® operating system, a BlackBerry® operating system, the Microsoft® Windows® Phone operating system, Symbian® OS, or webOS®. Further, the instructions 1124 may relate to operations performed by applications (commonly known as "apps"), consistent with some embodiments. One example of such an application is a mobile browser application that displays content, such as a web page or a user interface using a browser.

While the machine-readable medium 1122 is shown in an example embodiment to be a single medium, the term "machine-readable medium" may include a single medium or multiple media (e.g., a centralized or distributed database, and/or associated caches and servers) that store the one or more data structures or instructions 1124. The term "machine-readable medium" shall also be taken to include any tangible medium that is capable of storing, encoding, or carrying instructions (e.g., the instructions 1124) for execution by the machine and that cause the machine to perform any one or more of the methodologies of the present disclosure, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 1124 may further be transmitted or received over a network 1126 using a transmission medium. The instructions 1124 may be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying the instructions 1124 for execution by the machine, and includes digital or analog communications signals or other intangible media to facilitate communication of such software.

Although the embodiments of the present inventive subject matter have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A system comprising:
   a controller comprising:
      a reader configured to obtain garment attribute data of a garment, the reader to obtain the garment attribute data from a garment tag associated with the garment;
      a detector module configured to determine the garment is incompatible with a laundering device based on the garment attribute data; and
      a transmitter configured to transmit control data to the garment tag associated with the garment, the control data causing the garment tag to provide a human-detectable sensory alert in response to the determining the garment is incompatible with the laundering device.

2. The system of claim 1, further comprising the garment tag, the garment tag comprising:
   a machine-readable memory storing the garment attribute data of the garment;
   a receiver configured to receive the control data from the transmitter; and
   an alert component configured to provide the human-detectable sensory alert upon receiving the control data.

3. The system of claim 1, wherein the reader is configured to obtain the garment attribute data by performing operations comprising:
   transmitting a request to the garment tag for the garment attribute data of the garment; and
   receiving a response from the garment tag, the response comprising the garment attribute data of the garment.

4. The system of claim 1, wherein the reader is configured to be a radio-frequency identification (RFID) reader, and wherein the garment tag is configured to be an RFID device.

5. The system of claim 1, wherein the detector module is configured to determine the garment is incompatible with the laundering device upon determining the garment is proximate to a laundering device.

6. The system of claim 5, wherein the determining the garment is proximate to the laundering device is based on signal strength of the garment tag.

7. The system of claim 1, wherein the transmitter is configured to transmit the control data to an additional garment tag corresponding an additional garment, the control data causing the garment tag and the additional garment tag to provide an identical human-detectable sensory alert.

8. The system of claim 1, wherein the laundering device is selected from at least one of a washing machine, a clothes dryer, an iron, or a steamer.

9. The system of claim 1, wherein the garment attribute data includes at least one of fabric type, a color, a washing machine attribute, a bleaching attribute, a clothes dryer attribute, an ironing attribute, or a dry-cleaning attribute.

10. A method comprising:
    obtaining garment attribute data of a garment from a garment tag associated with the garment;
    determining the garment is incompatible with a laundering device based on the garment attribute data; and
    transmitting control data to the garment tag associated with the garment, the control data causing the garment tag to provide a human-detectable sensory alert in response to the determining the garment is incompatible with the laundering device.

11. The method of claim 10, wherein the obtaining of the garment attribute data comprises:
    transmitting a request to the garment tag for the garment attribute data of the garment; and
    receiving, at a reader coupled to the laundering device, a response from the garment tag, the response comprising the garment attribute data of the garment.

12. The method of claim 11, wherein the reader is configured to be a radio-frequency identification (RFID) reader, and wherein the garment tag is configured to be an RFID device.

13. The method of claim 10, further comprising determining the garment is proximate to the laundering device.

14. The method of claim 13, wherein the determining the garment is proximate to the laundering device is based on signal strength of the garment tag.

15. The method of claim 10, wherein the laundering device is selected from at least one of a washing machine, a clothes dryer, an iron, or a steamer.

16. The system of claim 10, wherein the garment attribute data includes at least one of fabric type, a color, a washing machine attribute, a bleaching attribute, a clothes dryer attribute, an ironing attribute, or a dry-cleaning attribute.

17. A garment tag comprising:
    a machine-readable memory storing garment attribute data of a garment;
    a receiver configured to receive control data from a controller of a laundering device, the control data to cause the garment tag to provide a human-detectable sensory alert based on a detected incompatible with the laundering device; and an alert component configured to provide the human-detectable sensory alert based on the detected incompatible with the laundering device.

18. The garment tag of claim 17, wherein the alert component comprises a light emitting component, and wherein the human-detectable sensory alert is a luminescent alert.

19. The garment tag of claim 17, wherein the alert component comprises a speaker, and wherein the human-detectable sensory alert is an auditory alert.

20. The garment tag of claim 17, wherein the alert component comprises a haptic actuator, and wherein the human-detectable sensory alert is a haptic alert.

* * * * *